United States Patent
Chislenko et al.

[11] Patent Number: 6,041,311
[45] Date of Patent: Mar. 21, 2000

[54] METHOD AND APPARATUS FOR ITEM RECOMMENDATION USING AUTOMATED COLLABORATIVE FILTERING

[75] Inventors: Alexander Chislenko; Yezdezard Z. Lashkari, both of Cambridge; John E. McNulty, Burlington, all of Mass.

[73] Assignee: Microsoft Corporation, Redmond, Wash.

[21] Appl. No.: 08/789,758

[22] Filed: Jan. 28, 1997

Related U.S. Application Data

[63] Continuation-in-part of application No. 08/597,442, Feb. 2, 1996, abandoned
[60] Provisional application No. 60/000,598, Jun. 30, 1995, and provisional application No. 60/008,458, Dec. 11, 1995.

[51] Int. Cl.⁷ ..................................................... G06F 17/30
[52] U.S. Cl. ................................. 705/27; 705/7; 705/8; 705/9; 707/102
[58] Field of Search ............................... 395/61, 183, 52; 705/7, 27, 8, 9; 364/401, 419; 707/102

[56] References Cited

U.S. PATENT DOCUMENTS

| | | | |
|---|---|---|---|
| 3,952,184 | 4/1976 | Bassard | 235/150 |
| 4,041,617 | 8/1977 | Hollander | 35/22 R |
| 4,205,464 | 6/1980 | Baggott | 35/22 R |
| 4,331,973 | 5/1982 | Eskin et al. | 358/84 |
| 4,348,740 | 9/1982 | White | 364/900 |
| 4,546,382 | 10/1985 | McKenna et al. | 358/84 |
| 4,566,030 | 1/1986 | Nickerson et al. | 358/84 |
| 4,602,279 | 7/1986 | Freeman | 358/86 |
| 4,627,818 | 12/1986 | VonFellenberg | 434/236 |
| 4,630,108 | 12/1986 | Gomersall | 358/84 |
| 4,646,145 | 2/1987 | Percy et al. | 358/84 |
| 4,647,964 | 3/1987 | Weinblatt | 358/84 |
| 4,658,290 | 4/1987 | McKenna et al. | 358/84 |
| 4,682,956 | 7/1987 | Krane | 434/237 |
| 4,745,549 | 5/1988 | Hashimoto | 364/402 |
| 4,775,935 | 10/1988 | Yourick | 345/357 |
| 4,781,596 | 11/1988 | Weinblatt | 434/236 |

(List continued on next page.)

FOREIGN PATENT DOCUMENTS

| | | |
|---|---|---|
| 0 643 359 A2 | 3/1995 | European Pat. Off. . |
| 0 749 078 A1 | 12/1996 | European Pat. Off. . |
| 0 751 471 A1 | 1/1997 | European Pat. Off. . |
| WO 95/29451 | 10/1995 | WIPO . |
| WO 95/29452 | 10/1995 | WIPO . |
| WO 96/23265 | 8/1996 | WIPO . |

OTHER PUBLICATIONS

Lee et al. "Learning Automated Product Recommendations Without Observable Features: An Initial Investigation"; The Robotics Institute Carnegie Mellon University Pittsburg, Pennsylvania 15213, Apr. 1995.

(List continued on next page.)

*Primary Examiner*—Allen R. MacDonald
*Assistant Examiner*—Romain Jeanty
*Attorney, Agent, or Firm*—Michaelson & Wallace; Peter L. Michaelson

[57] ABSTRACT

A method for recommending items to users using automated collaborative filtering stores profiles of users relating ratings to items in memory. Profiles of items may also be stored in memory, the item profiles associating users with the rating given to the item by that user or inferred for the user by the system The user profiles include additional information relating to the user or associated with the rating given to an item by the user. Similarity factors with respect to other users, and confidence factors associated with the similarity factors, are calculated for a user and these similarity factors, in connection with the confidence factors, are used to select a set of neighboring users. The neighboring users are weighted based on their respective similarity factors, and a rating for an item contained in the domain is predicted. In one embodiment, items in the domain have features. In this embodiment, the values for features can be clustered, and the similarity factors incorporate assigned feature weights and feature value cluster weights.

33 Claims, 4 Drawing Sheets

U.S. PATENT DOCUMENTS

| | | | |
|---|---|---|---|
| 4,870,579 | 9/1989 | Hey | 364/419 |
| 4,872,113 | 10/1989 | Dinerstein | 364/401 |
| 4,914,694 | 4/1990 | Leonard et al. | 380/5 |
| 4,996,642 | 2/1991 | Hey | 705/27 |
| 5,034,981 | 7/1991 | Leonard et al. | 380/5 |
| 5,041,972 | 8/1991 | Frost | 705/10 |
| 5,446,891 | 8/1995 | Kaplan et al. | 395/600 |
| 5,459,306 | 10/1995 | Stein et al. | 235/383 |
| 5,466,159 | 11/1995 | Clark et al. | 434/322 |
| 5,544,161 | 8/1996 | Bigham et al. | 370/58.1 |
| 5,583,763 | 12/1996 | Atcheson et al. | 364/551.01 |
| 5,592,375 | 1/1997 | Salmon et al. | 705/7 |
| 5,692,107 | 11/1997 | Simoudis | 706/12 |
| 5,699,507 | 12/1997 | Goodnow, II et al. | 395/183 |
| 5,704,017 | 12/1997 | Heckerman et al. | 706/12 |
| 5,749,081 | 5/1998 | Whitesis | 707/102 |

OTHER PUBLICATIONS

Hiraiwa et al, "Info–Plaza: A Social Information Filtering System for the World–Wide Web," Insitute for Social Information Science Fujitsu Labortories Ltd., pp. 10–15 (1996).

Lee, Mary S. and Andrew W. Moore, "Learning Automated Product Recommendations Without Observable Features: An Initial Invesitgator," The Robotics Institute, Carnegie Mellon University, pp. 1–35 (Apr. 1995).

Resnick et al, "GroupLens: An Open Architecture for Collaborative Filtering of Networks" pp. 175–186 (1994).

Sheth et al, "Evolving Agents for Personalized Information Filtering," Proceedings of the Ninth Conference on Artificial Intelligence for Applications, pp. 345–352 (Mar. 1–5, 1993).

Jennings et al, "A Personal New Service Based on a User Neural Network," *IEICE Transactions on Information Systems*, No. 2, pp. 190–209 Tokyo, Japan Mar. 1992.

METHOD AND APPARATUS FOR ITEM RECOMMENDATION USING AUTOMATED COLLABORATIVE FILTERING

This application is a continuation-in-part application of co-pending application Ser. No. 08/597,442 filed Feb. 2, 1996, which itself claims priority to provisional application Serial No. 60/000,598, filed Jun. 30, 1995, now expired, and provisional application 60/008,458, filed Dec. 11, 1995, now expired, all of which are incorporated herein by reference.

FIELD OF THE INVENTION

The present invention relates to an improved method and apparatus for recommending items and, in particular, to an improved method and apparatus for recommending items using automated collaborative filtering and feature-guided automated collaborative filtering.

BACKGROUND OF THE INVENTION

The amount of information, as well as the number of goods and services, available to individuals is increasing exponentially. This increase in items and information is occurring across all domains, e.g. sound recordings, restaurants, movies, World Wide Web pages, clothing stores, etc. An individual attempting to find useful information, or to decide between competing goods and services, is often faced with a bewildering selection of sources and choices.

Individual sampling of all items, even in a particular domain, may be impossible. For example, sampling every restaurant of a particular type in New York City would tax even the most avid diner. Such a sampling would most likely be prohibitively expensive to carry out, and the diner would have to suffer through many unenjoyable restaurants.

In many domains, individuals have simply learned to manage information overload by relying on a form of generic referral system. For example, in the domain of movie and sound recordings, many individuals rely on reviews written by paid reviewers. These reviews, however, are simply the viewpoint of one or two individuals and may not have a likelihood of correlating with how the individual will actually perceive the movie or sound recording. Many individuals may rely on a review only to be disappointed when they actually sample the item.

One method of attempting to provide an efficient filtering mechanism is to use content-based filtering. The content-based filter selects items from a domain for the user to sample based upon correlations between the content of the item and the user's preferences. Content-based filtering schemes suffer from the drawback that the items to be selected must be in some machine-readable form, or attributes describing the content of the item must be entered by hand. This makes content-based filtering problematic for existing items such as sound recordings, photographs, art, video, and any other physical item that is not inherently machine-readable. While item attributes can be assigned by hand in order to allow a content-based search, for many domains of items such assignment is not practical. For example, it could take decades to enter even the most rudimentary attributes for all available network television video clips by hand.

Perhaps more importantly, even the best content-based filtering schemes cannot provide an analysis of the quality of a particular item as it would be perceived by a particular user, since quality is inherently subjective. So, while a content-based filtering scheme may select a number of items based on the content of those items, a content-based filtering scheme generally cannot further refine the list of selected items to recommend items that the individual will enjoy.

SUMMARY OF THE INVENTION

The present invention relates to an improved method and apparatus for recommending items to users of a system which uses automated collaborative filtering to accurately predict the rating that a user will give to an item based on the rating given to that item by users that have tastes closely correlated with that user.

In one aspect, the invention relates to a method for recommending an item to a user. A user profile is stored in memory for a number of users, and the user profiles store the ratings given to items by a particular user, as well as additional information. The additional information may be information about the user or it may be information regarding the ratings given to an item by that user. Item profiles also may be stored in memory and the item profiles store ratings given to that item by a number of users.

The information stored in the user profiles is used to calculate a set of similarity factors which indicate the amount of correlation between a user and other users of the system. A plurality of users that are closely correlated to a particular user are selected as that user's neighboring users and a weight is assigned to each of them. The ratings given to items by the neighboring users as well as the weights assigned to those neighboring users are then used to predict ratings and to make recommendations of items that the user has not yet rated.

In another aspect, the invention relates to an apparatus for recommending items which include a memory element for storing user profiles, each user profile including at least rating information. The apparatus also includes a means for calculating similarity factors between users, means for selecting neighboring users, and means for assigning a weight to those neighboring users. Also included are means for recommending one of the items to one of the users based on that user's neighboring users and the weights assigned to that user's neighboring users.

In yet another aspect, the invention relates to an article of manufacture having embodied thereon computer-readable program means for storing user profiles in a memory. The article of manufacture includes computer-readable program means for storing user profiles in a memory element, and each user profile includes at least rating information. The article of manufacture also includes computer-readable program means for calculating similarity factors between users, computer-readable program means for selecting neighboring users, and computer-readable program means for assigning a weight to those neighboring users. Also included is computer-readable program means for recommending one of the items to one of the users based on that user's neighboring users and the weights assigned to that user's neighboring users.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF THE INVENTION

Figure 1:
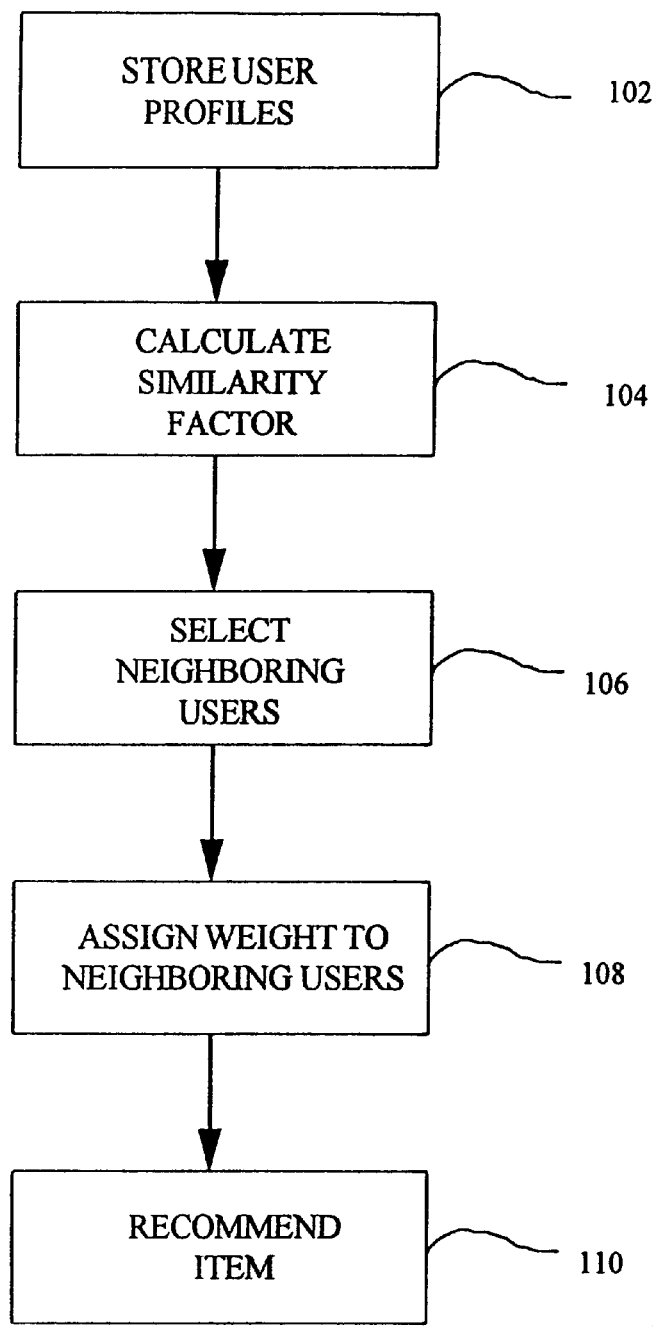
FIG. 1 is a flowchart of one embodiment of the method.

As referred to in this description, items to be recommended can be items of any type that a user may sample in a domain. When reference is made to a "domain," it is intended to refer to any category or subcategory of ratable items, such as sound recordings, movies, restaurants, vacation destinations, novels, or World Wide Web pages. Referring now to FIG. 1, a method for recommending items begins by storing user and item information in profiles.

A plurality of user profiles is stored in a memory element (step 102). One profile may be created for each user or multiple profiles may be created for a user to represent that user over multiple domains. Alternatively, a user may be represented in one domain by multiple profiles where each profile represents the proclivities of a user in a given set of circumstances. For example, a user that avoids seafood restaurants on Fridays, but not on other days of the week, could have one profile representing the user's restaurant preferences from Saturday through Thursday, and a second profile representing the user's restaurant preferences on Fridays. In some embodiments, a user profile represents more than one user. For example, a profile may be created which represents a woman and her husband for the purpose of selecting movies. Using this profile allows a movie recommendation to be given which takes into account the movie tastes of both individuals. For convenience, the remainder of this specification will use the term "user" to refer to single users of the system, as well as "composite users." The memory element can be any memory element known in the art that can store user profile data and allowing the user profiles to be updated, such as a disc drive or random access memory.

Each user profile associates items with the ratings given to those items by the user. Each user profile may also store information in addition to the user's ratings. In one embodiment, the user profile stores information about the user, e.g. name, address, or age. In another embodiment, the user profile stores information about the rating, such as the time and date the user entered the rating for the item. User profiles can be any data construct that facilitates these associations, such as an array, although it is preferred to provide user profiles as sparse vectors of n-tuples. Each n-tuple contains at least an identifier representing the rated item and an identifier representing the rating that the user gave to the item, and may include any number of additional pieces of information regarding the item, the rating, or both. Some of the additional pieces of information stored in a user profile may be calculated based on other information in the profile. For example, an average rating for a particular selection of items (e.g., heavy metal albums) may be calculated and stored in the user's profile. In some embodiments, the profiles are provided as ordered n-tuples.

A profile for a user can be created and stored in a memory element when that user first begins rating items, although in multi-domain applications user profiles may be created for particular domains only when the user begins to explore, and rate items within, those domains. Alternatively, a user profile may be created for a user before the user rates any items in a domain. For example, a default user profile may be created for a domain which the user has not yet begun to explore based on the ratings the user has given to items in a domain that the user has already explored.

Whenever a user profile is created, a number of initial ratings for items may be solicited from the user. This can be done by providing the user with a particular set of items to rate corresponding to a particular group of items. Groups are genres of items and are discussed below in more detail. Other methods of soliciting ratings from the user may include: manual entry of item-rating pairs, in which the user simply submits a list of items and ratings assigned to those items; soliciting ratings by date of entry into the system, i.e., asking the user to rate the newest items added to the system; soliciting ratings for the items having the most ratings; or by allowing a user to rate items similar to an initial item selected by the user. In still other embodiments, the system may acquire a number of ratings by monitoring the user's environment. For example, the system may assume that Web sites for which the user has created "bookmarks" are liked by that user and may use those sites as initial entries in the user's profile. One embodiment uses all of the methods described above and allows the user to select the particular method they wish to employ.

Ratings for items which are received from users can be of any form that allows users to record subjective impressions of items based on their experience of the item. For example, items may be rated on an alphabetic scale ("A" to "F") or a numerical scale (1 to 10). In one embodiment, ratings are integers between 1 (lowest) and 7 (highest). Ratings can be received as input to a stand-alone machine, for example, a user may type rating information on a keyboard or a user may enter such information via a touch screen. Ratings may also be received as input to a system via electronic mail, by telephone, or as input to a system via a local area or wide area network. In one embodiment, ratings are received as input to a World Wide Web page. In this embodiment, the user positions a cursor on a World Wide Web page with an input device such as a mouse or trackball. Once the cursor is properly positioned, the user indicates a rating by using a button on the input device to select a rating to enter. Ratings can be received from users singularly or in batches, and may be received from any number of users simultaneously.

Ratings can be inferred by the system from the user's usage pattern. For example, the system may monitor how long the user views a particular Web page and store in that user's profile an indication that the user likes the page, assuming that the longer the user views the page, the more the user likes the page. Alternatively, a system may monitor the user's actions to determine a rating of a particular item for the user. For example, the system may infer that a user likes an item which the user mails to many people and enter in the user's profile and indication that the user likes that item. More than one aspect of user behavior may be monitored in order to infer ratings for that user, and in some embodiments, the system may have a higher confidence factor for a rating which it inferred by monitoring multiple aspects of user behavior. Confidence factors are discussed in more detail below.

Profiles for each item that has been rated by at least one user may also be stored in memory. Each item profile records how particular users have rated this particular item. Any data construct that associates ratings given to the item with the user assigning the rating can be used. It is preferred to provide item profiles as a sparse vector of n-tuples. Each n-tuple contains at least an identifier representing a particular user and an identifier representing the rating that user gave to the item, and it may contain other information, as described above in connection with user profiles. Item profiles may be created when the first rating is given to an item or when the item is first entered into the system.

Alternatively, item profiles may be generated from the user profiles stored in memory, by determining, for each user, if that user has rated the item and, if so, storing the rating and user information in the item's profile. Item profiles may be stored before user profiles are stored, after user profiles are stored, or at the same time as user profiles.

The additional information associated with each item-rating pair can be used by the system for a variety of purposes, such as assessing the validity of the rating data. For example, if the system records the time and date the rating was entered, or inferred from the user's environment, it can determine the age of a rating for an item. A rating which is very old may indicate that the rating is less valid than a rating entered recently, for example, users' tastes may change or "drift" over time. One of the fields of the n-tuple may represent whether the rating was entered by the user or inferred by the system. Ratings that are inferred by the system may be assumed to be less valid than ratings that are actually entered by the user. Other items of information may be stored, and any combination or subset of additional information may be used to assess rating validity. In some embodiments, this validity metric may be represented as a confidence factor, that is, the combined effect of the selected pieces of information recorded in the n-tuple may be quantified as a number. In some embodiments, that number may be expressed as a percentage representing the probability that the associated rating is incorrect or as an expected deviation of the predicted rating from the "correct" value.

The user profiles are accessed in order to calculate similarity factors for each user with respect to all other users (step 104). A similarity factor represents the degree of correlation between any two users with respect to a set of items. The calculation to be performed may be selected such that the more two users correlate, the closer the similarity factor is to zero. Specialized hardware may be provided for calculating the similarity factors between users, although it is preferred to provide a general-purpose computer with appropriate programming to calculate the similarity factors.

Whenever a rating is received from a user or is inferred by the system from that user's behavior, the profile of that user may be updated as well as the profile of the item rated. Profile updates may be stored in a temporary memory location and entered at a convenient time or profiles may be updated whenever a new rating is entered by or inferred for that user. Profiles can be updated by appending a new n-tuple of values to the set of already existing n-tuples in the profile or, if the new rating is a change to an existing rating, overwriting the appropriate entry in the user profile. Updating a profile also requires re-computation of any profile entries that are based on other information in the profile.

Whenever a user's profile is updated with new rating-item n-tuple, new similarity factors between the user and other users of this system may be calculated. The similarity factors for a user may be calculated by comparing that user's profile with the profile of every other user of the system. This is computationally intensive, since the order of computation for calculating similarity factors in this manner is $n^2$, where n is the number of users of the system. It is possible to reduce the computational load associated with re-calculating similarity factors in embodiments that store item profiles by first retrieving the profiles of the newly-rated item and determining which other users have already rated that item. The similarity factors between the newly-rating user and the users that have already rated the item are the only similarity factors updated.

Any number of methods can be used to calculate the similarity factors. In general, a method for calculating similarity factors between users should minimize the deviation between a predicted rating for an item and the rating a user would actually have given the item.

It is also desirable to reduce error in cases involving "extreme" ratings. That is, a method which predicts fairly well for item ratings representing ambivalence towards an item but which does poorly for item ratings representing extreme enjoyment or extreme disappointment with an item is not useful for recommending items to users.

Similarity factors between users refers to any quantity which expresses the degree of correlation between two user's profiles for a particular set of items. The following methods for calculating the similarity factor are intended to be exemplary, and in no way exhaustive. Depending on the item domain, different methods will produce optimal results, since users in different domains may have different expectations for rating accuracy or speed of recommendations. Different methods may be used in a single domain, and, in some embodiments, the system allows users to select the method by which they want their similarity factors produced.

In the following description of methods, $D_{xy}$ represents the similarity factor calculated between two users, x and y. $H_{ix}$ represents the rating given to item i by user x, I represents all items in the database, and $c_{ix}$ is a Boolean quantity which is 1 if user x has rated item i and 0 if user x has not rated that item.

One method of calculating the similarity between a pair of users is to calculate the average squared difference between their ratings for mutually rated items. Thus, the similarity factor between user x and user y is calculated by subtracting, for each item rated by both users, the rating given to an item by user y from the rating given to that same item by user x and squaring the difference. The squared differences are summed and divided by the total number of items rated. This method is represented mathematically by the following expression:

$$D_{xy} = \frac{\sum_{i \in I} c_{ix}(c_{iy}(H_{ix} - H_{iy}))^2}{\sum_{i \in I} c_{ix}c_{iy}}$$

A similar method of calculating the similarity factor between a pair of users is to divide the sum of their squared rating differences by the number of items rated by both users raised to a power. This method is represented by the following mathematical expression:

$$D_{xy} = \frac{\sum_{i \in C_{xy}} (H_{ix} - H_{iy})^2}{|C_{xy}|^k}$$

where $|C_{xy}|$ represents the number of items rated by both users.

A third method for calculating the similarity factor between users attempts to factor into the calculation the degree of profile overlap, i.e. the number of items rated by both users compared to the total number of items rated by either one user or the other. Thus, for each item rated by both users, the rating given to an item by user y is subtracted from the rating given to that same item by user x. These differences are squared and then summed. The amount of profile overlap is taken into account by dividing the sum of squared rating differences by a quantity equal to the number of items mutually rated by the users subtracted from the sum of the number of items rated by user x and the number of items rated by users y. This method is expressed mathematically by:

$$D_{xy} = \frac{\sum_{i \in C_{xy}} (H_{ix} - H_{iy})^2}{\sum_{i \in I} c_{ix} + \sum_{i \in I} c_{iy} - |C_{xy}|}$$

where $|C_{xy}|$ represents the number of items mutually rated by users x and y.

In another embodiment, the similarity factor between two users is a Pearson r correlation coefficient. Alternatively, the similarity factor may be calculated by constraining the correlation coefficient with a predetermined average rating value, A. Using the constrained method, the correlation coefficient, which represents $D_{xy}$, is arrived at in the following manner. For each item rated by both users, A is subtracted from the rating given to the item by user x and the rating given to that same item by user y. Those differences are then multiplied. The summed product of rating differences is divided by the product of two sums. The first sum is the sum of the squared differences of the predefined average rating value, A, and the rating given to each item by user x. The second sum is the sum of the squared differences of the predefined average value, A, and the rating given to each item by user y. This method is expressed mathematically by:

$$D_{xy} = \frac{\sum_{i \in C_{xy}} (H_{ix} - A)(H_{iy} - A)}{\sqrt{\sum_{i \in U_x} (H_{ix} - A)^2 \sum_{i \in U_y} (H_{iy} - A)^2}}$$

where $U_x$ represents all items rated by x, $U_y$ represents all items rated by y, and $C_{xy}$ represents all items rated by both x and y.

The additional information included in a n-tuple may also be used when calculating the similarity factor between two users. For example, the information may be considered separately in order to distinguish between users, e.g. if a user tends to rate items only at night and another user tends to rate items only during the day, the users may be considered dissimilar to some degree, regardless of the fact that they may have rated an identical set of items identically. Alternatively, if the additional information is being used as a confidence factor as described above, then the information may be used in at least two ways.

In one embodiment, only item ratings that have a confidence factor above a certain threshold are used in the methods described above to calculate similarity factors between users.

In a second embodiment, the respective confidence factors associated with ratings in each user's profile may be factored into each rating comparison. For example, if a first user has given an item a rating of "7" which has a high confidence factor, but a second user has given the same item a rating of "7" with a low confidence factor, the second user's rating may be "discounted." For example, the system may consider the second user as having a rating of "4" for the item instead of "7." Once ratings are appropriately "discounted", similarity factors can be calculated using any of the methods described above.

Regardless of the method used to generate them, or whether the additional information contained in the profiles is used, the similarity factors are used to select a plurality of users that have a high degree of correlation to a user (step 106). These users are called the user's "neighboring users." A user may be selected as a neighboring user if that user's similarity factor with respect to the requesting user is better than a predetermined threshold value, L. The threshold value, L, can be set to any value which improves the predictive capability of the method. In general, the value of L will change depending on the method used to calculate the similarity factors, the item domain, and the size of the number of ratings that have been entered. In another embodiment, a predetermined number of users are selected from the users having a similarity factor better than L, e.g. the top twenty-five users. For embodiments in which confidence factors are calculated for each user-user similarity factor, the neighboring users can be selected based on having both a threshold value less than L and a confidence factor higher than a second predetermined threshold.

In some embodiments, users are placed in the rating user's neighbor set based on considerations other than the similarity factor between the rating user and the user to be added to the set. For example, the additional information associated with item ratings may indicate that whenever user A has rated an item highly, User B has sampled that item and also liked it considerably. The system may assume that User B enjoys following the advice of User A. However, User A may not be selected for User B's neighbor set using the methods described above due to a number of reasons, including that there may be a number of users in excess of the threshold, L, which highly correlate with User B's profile. These highly correlated users will fill up User B's neighbor set regardless of their use in recommending new items to User B.

Alternatively, certain users may not be included in a neighbor set because their contribution is cumulative. For example, if a user's neighbor set already includes two users that have rated every Dim Sum restaurant in Boston, a third user that has rated only Dim Sum restaurants in Boston would be cumulative, regardless of the similarity factor calculated for that user, and another user who has rated different items in a different domain may be included instead.

Another embodiment in which neighbors may be chosen for a user based on the additional information stored in the user profiles concerns multi-domain settings. In these settings, a user may desire to explore a new domain of items. However, the user's neighbors may not have explored that domain sufficiently to provide the user with adequate recommendations for items to sample. In this situation, users may be selected for the exploring user's neighbor set based on various factors, such as the number of items they have rated in the domain which the user wants to explore. This may be done on the assumption that a user that has rated many items in a particular domain is an experienced guide to that domain.

A user's neighboring user set should be updated each time that a new rating is entered by, or inferred for, that user. In many applications it is desirable to reduce the amount of computation required to maintain the appropriate set of neighboring users by limiting the number of user profiles consulted to create the set of neighboring users. In one embodiment, instead of updating the similarity factors between a rating user and every other user of the system (which has computational order of $n^2$), only the similarity factors between the rating user and the rating user's neighbors, as well as the similarity factors between the rating user and the neighbors of the rating user's neighbors are updated. This limits the number of user profiles which must be compared to $m^2$ minus any degree of user overlap between the neighbor sets where m is a number smaller than n. In this embodiment, similar users are selected in any manner as described above, such as a similarity factor threshold, a combined similarity factor-confidence factor threshold, or solely on the basis of additional information contained in user profiles.

Once a set of neighboring users is chosen, a weight is assigned to each of the neighboring users (step 108). In one embodiment, the weights are assigned by subtracting the similarity factor calculated for each neighboring user from the threshold value and dividing by the threshold value. This provides a user weight that is higher, i.e. closer to one, when the similarity factor between two users is smaller. Thus, similar users are weighted more heavily than other, less similar, users. In other embodiments, the confidence factor can be used as the weight for the neighboring users. Users that are placed into a neighbor set on the basis of other information, i.e. "reputation" or experience in a particular domain, may have an appropriate weight selected for them. For example, if a user is selected because of their experience with a particular domain, that user may be weighted very highly since it is assumed that they have much experience with the items to be recommended. The weights assigned to such users may be adjusted accordingly to enhance the recommendations given to the user.

Once weights are assigned to the neighboring users, an item is recommended to a user (step 110). For applications in which positive item recommendations are desired, items are recommended if the user's neighboring users have also rated the item highly. For an application desiring to warn users away from items, items are displayed as recommended against when the user's neighboring users have also given poor ratings to the item. Once again, although specialized hardware may be provided to select and weight neighboring users, an appropriately programmed general-purpose computer may provide these functions.

The item to be recommended may be selected in any fashion, so long as the ratings of the neighboring users, their assigned weights, and the confidence factors, if any, are taken into account. In one embodiment, a rating is predicted for each item that has not yet been rated by the user. This predicted rating can be arrived at by taking a weighted average of the ratings given to those items by the user's neighboring users. A predetermined number of items may then be recommended to the user based on the predicted ratings.

Recommendations may also be generated using the additional information associated with the user ratings or the confidence factors associated with the similarity factors calculated between a user and the user's neighbors. For example, the additional information may be used to discount the rating given to items. In this embodiment, the additional information may indicate that a rating is possibly invalid or old would result in that rating being weighted less than other ratings. The additional information may be expressed as a confidence factor and, in this embodiment, items are recommended only if the user's neighboring user both recommends them highly and there is a high confidence factor associated with that user's rating of the item.

The predetermined number of items to recommend can be selected such that those items having the highest predicted rating are recommended to the user or the predetermined number of items may be selected based on having the lowest predicted rating of all the items. Alternatively, if a system has a large number of items from which to select items to recommend, confidence factors can be used to limit the amount of computation required by the system to generate recommendation. For example, the system can select the first predetermined number of items that are highly rated by the user's neighbors for which the confidence factor is above a certain threshold.

Recommendations can take any of a number of forms. For example, recommended items may be output as a list, either printed on paper by a printer, visually displayed on a display screen, or read aloud.

In another embodiment the user selects an item for which a predicted rating is desired. A rating can be predicted by taking a weighted average of the ratings given to that item by the user's neighboring users.

Whatever method is used, information about the recommended items can be displayed to the user. For example, in a music domain, the system may display a list of recommended albums including the name of the recording artist, the name of the album, the record label which made the album, the producer of the album, "hit" songs on the album, and other information. In the embodiment in which the user selects an item and a rating is predicted for that item, the system may display the actual rating predicted, or a label representing the predicted rating. For example, instead of displaying 6.8 out of a possible 7.0 for the predicted rating, a system may instead display "highly recommended". Embodiments in which a confidence factor is calculated for each prediction may display that information to the user, either as a number or a label. For example, the system may display "highly recommended—85% confidence" or it may display "highly recommended—very sure."

In one embodiment, items are grouped in order to help predict ratings and increase recommendation certainty. For example, in the broad domain of music, recordings may be grouped according to various genres, such as "opera," "pop," "rock," and others. Groups are used to improve performance because predictions and recommendations for a particular item are made based only on the ratings given to other items within the same group. Groups may be determined based on information entered by the users, however it is currently preferred to generate the groups using the item data itself.

Generating the groups using the item data itself can be done in any manner which groups items together based on some differentiating feature. For example, in the item domain of music recordings, groups could be generated corresponding to "pop," "opera," and others.

In the preferred embodiment, item groups are generated by, first, randomly assigning all items in the database to a number of groups. The number of desired groups can be predetermined or random. For each initial group, the centroid of the ratings for items assigned to that group are calculated. This can be done by any method that determines the approximate mean value of the spectrum of ratings contained in the item profiles assigned to the initial group, such as eigenanalysis. It is currently preferred is to average all values present in the initial group.

After calculating the group centroids, determine to which group centroid each item is closest, and move it to that group. Whenever an item is moved in this manner, recalculate the centroids for the affected groups. Iterate until the distance between all group centroids and items assigned to each group are below a predetermined threshold or until a certain number of iterations have been accomplished.

A method using grouping to improve performance calculates similarity factors for a user with respect to other users for a particular group (step 104). For example, a user may have one similarity factor with respect to a second user for the "pop" grouping of music items and a second similarity factor with respect to that same user for the "opera" grouping of music items. This is because the "pop" similarity factor is calculated using only ratings for "pop" items, while the "opera" similarity factor is calculated only for "opera" items. Any of the methods described above for calculating similarity factors may be used.

The neighboring users are selected based on the similarity factors (step 106). The neighboring users are weighted, and recommendations for items are arrived at (steps 108 and 110) as above. A weighted average of the ratings given to other items in the group can be used to recommend items both inside the group and outside the group. For example, if a user has a high correlation with another user in the "pop" grouping of music items, that similarity factor can be used to recommend music items inside the "pop" grouping, since both users have rated many items in the group. The similarity factor can also be used to recommend a music item outside of the group, if one of the users has rated an item in another group. Alternatively, a user may select a group, and a recommendation list will be generated based on the predicted rating for the user's neighboring users in that group.

Whether or not grouping is used, a user or set or users may be recommended to a user as having similar taste in items of a certain group. In this case, the similarity factors calculated from the user profiles and item profiles are used to match similar users and introduce them to each other. This is done by recommending one user to another in much the same way that an item is recommended to a user. It is possible to increase the recommendation certainty by including the number of items rated by both users in addition to the similarity factors calculated for the users.

The user profiles and, if provided, item profiles may be used to allow communication to be targeted to specific users that will be most receptive to the communication. This may be done in at least two ways.

In a first embodiment, a communication is provided which is intended to be delivered to users that have rated a particular item or set of items highly. In this embodiment, if the communication is to be targeted at users that have rated a particular item highly, then the profile for that item is retrieved from memory and users which have rated the item highly are determined. The determination of users that have rated the item highly may be done in any number of ways, for example, a threshold value may be set and users which have given a rating for the item in excess of that threshold value would be selected as targeted users.

Alternatively, if the communication is to be targeted at users that have rated a set of items highly, then each profile for each item that is to be considered can be retrieved from the memory element and a composite rating of items may be produced for each user. The composite rating may be a weighted average of the individual ratings given to the items by a user; each item may be weighted equally with all the other items or a predetermined weight may be assigned to each individual item. In this embodiment, once a composite rating for each user has been determined, then targeted users are selected. This selection may be done by setting a predetermined threshold which, when a user's composite rating is in excess of, indicates that user is a targeted user.

In either embodiment, once targeted users are selected, the communication is displayed on that user's screen whenever the user accesses the system. In other embodiments the communication may be a facsimile message, an electronic mail message, or an audio message.

In a second embodiment, the communication which is to be targeted to selected users may seek out its own receptive users based on information stored in the user profiles and ratings given to the communication by users of the system. In this embodiment, the communication initially selects a set of users to which it presents itself. The initial selection of users may be done randomly, or the communication may be "preseeded" with a user profile which is its initial target.

Once a communication presents itself to a user or set of users, it requests a rating from that user or users. Users may then assign a rating to the communication in any of the ways described above. Once a communication receives a rating or ratings from users, the communication determines a new set of users to which it presents itself based on the received rating. One way the communication does this is to choose the neighbors of users that have rated it highly. In another embodiment, the communication analyzes the ratings it has received to determine the ideal user profile for a hypothetical user in the second set of users to which it will present itself The communication does this by retrieving from memory the user profiles of each user that has given it a rating. The communication then analyzes those user profiles to determine characteristics associated with users that have given it a favorable rating.

The communication may assume that it can infer more from looking at items that users have rated favorably or it may instead attempt to gather information based on items that those users have rated unfavorably. Alternatively, some selection of items in a group may be used to determine characteristics of favorable user profiles. In this embodiment, the communication may perform a similarity factor calculation using any of the methods described above. The set of neighboring users is the set of users to which the communication will present itself.

Once the communication has presented itself to the second set of users, the series of steps repeats with the new users rating the communication and the communication using that information to further refine its ideal user to which it will present itself. In some embodiments, a limit may be placed the number of users to which a communication may present itself in the form of tokens which the communication spends to present itself to a user, perform a similarity factor calculation, or other activities on the system. For example, a communication may begin with a certain number of tokens. For each user that it presents itself to, the communication must spend a token. The communication may be rewarded for users who rate it highly by receiving more tokens from the system than it had to pay to present itself to that user. Also, a communication may be penalized for presenting itself to users who give it a low rating. This penalty may take the form of a required payment of additional tokens or the communication may simply not receive tokens for the poor rating given to it by the user. Once the communication is out of tokens, it is no longer active on the system.

Grouping, as described above, is a special case of "feature-guided automated collaborative filtering" when there is only one feature of interest. The method of the present invention works equally well for item domains in which the items have multiple features of interest, such as World Wide Web pages.

The method using feature-guided automated collaborative filtering incorporates feature values associated with items in the domain. The term "feature value" is used to describe any information stored about a particular feature of the item. For example, a feature YL, JM, AC may have boolean feature values indicating whether or not a particular feature exists or does not exist in a particular item.

Alternatively, features may have numerous values, such as terms appearing as "keywords" in a document. In some embodiments, each feature value can be represented by a vector in some metric space, where each term of the vector corresponds to the mean score given by a user to items having the feature value.

Ideally, it is desirable to calculate a vector of distances between every pair of users, one for each possible feature value defined for an item. This may not be possible if the number of possible feature values is very large, i.e., keywords in a document, or the distribution of feature values is extremely sparse. Thus, in many applications, it is desirable to cluster feature values. The terms "cluster" and "feature value cluster" are used to indicate both individual feature values as well as feature value clusters, even though feature values may not necessarily be clustered.

Feature value clusters are created by defining a distance function $\Delta$, defined for any two points in the vector space, as well as vector combination function $\Omega$, which combines any two vectors in the space to produce a third point in the space that in some way represents the average of the points. Although not limited to the examples presented, three possible formulations of $\Delta$ and $\Omega$ are presented below.

The notion of similarity between any two feature values is how similarly they have been rated by the same user, across the whole spectrum of users and items. One method of defining the similarity between any two feature values is to take a simple average. Thus, we define the value $\vec{v}_I^{\alpha x}$ to be the mean of the rating given to each item containing feature value $FV_x^\alpha$ that user i has rated. Expressed mathematically:

$$\vec{v}_I^{\alpha x} = \begin{cases} \dfrac{\sum_{p=1}^{\|Items\|}(R_{I,p} \times c_{I,p} \times \Gamma_p^{\alpha x})}{\sum_{p=1}^{\|Items\|}(c_{I,p} \times \Gamma_p^{\alpha x})} & \text{iff}\left(\sum_{p=1}^{\|Items\|} c_{I,p} \times \Gamma_p^{\alpha x}\right) \geq 1 \\ \text{Undefined} & \text{Otherwise} \end{cases}$$

Where $\Gamma_p^{\alpha x}$ indicates the presence or absence of feature value $FV_x^\alpha$ in item p. Any distance metric may be used to determine the per-user dimension squared distance between vectors feature value $\alpha_x$ and feature value $\alpha_y$ for user i. For example, any of the methods referred to above for calculating user similarity may be used.

Defining $\delta$ as the per-user dimension squared distance between two feature values, the total distance between the two feature value vectors is expressed mathematically as:

$$\Delta(\vec{F}V_x^\alpha, \vec{F}V_y^\alpha) = \sqrt{\left(\frac{\|Users\|}{\sum_{I=1}^{\|Users\|} \eta_I^{\alpha x} \times \eta_I^{\alpha y}}\right) \times \left(\sum_{I=1}^{\|Users\|} \delta_I^{\alpha xy}\right)}$$

where, the term $$\frac{\|Users\|}{\sum_{I=1}^{\|Users\|} \eta_I^{\alpha x} \times \eta_I^{\alpha y}}$$

represents adjustment for missing data.

The combination function for the two vectors, which represents a kind of average for the two vectors, is expressed mathematically by the following three equations.

$$\Omega(\vec{F}V_x^\alpha, \vec{F}V_y^\alpha) = \begin{cases} \dfrac{\vec{v}_I^{\alpha x} + \vec{v}_I^{\alpha y}}{2} & \text{if } \eta_I^{\alpha x} = 1 \text{ and } \eta_I^{\alpha y} = 1 \\ \vec{v}_I^{\alpha x} & \text{if } \eta_I^{\alpha x} = 1 \text{ and } \eta_I^{\alpha y} = 0 \\ \vec{v}_I^{\alpha y} & \text{if } \eta_I^{\alpha x} = 0 \text{ and } \eta_I^{\alpha y} = 1 \end{cases}$$

wherein $\eta_I^{\alpha x}$ indicates whether $\vec{v}_I^{\alpha x}$ is defined.

Another method for calculating the similarity between any two feature values is to assume the number of values used to compute $\vec{v}_I^{\alpha x}$ is sufficiently large. If this assumption is made, the Central Limit Theorem can be used to justify approximating the distribution of vectors by a Gaussian distribution.

Since the Gaussian distribution can be effectively characterized by its mean, variance and sample size, each entry $\vec{v}_I^{\alpha x}$ is now a triplet.

$$\vec{v}_I^{\alpha x} = \langle \mu_I^{\alpha x}, \sigma_I^{2\alpha x}, N_I^{\alpha x} \rangle$$

where $$\mu_I^{\alpha x} = \frac{\sum_{p=1}^{\|Items\|}(R_{I,p} \times c_{I,p} \times \Gamma_p^{\alpha x})}{\sum_{p=1}^{\|Items\|} c_{I,p} \times \Gamma_p^{\alpha x}}$$

is the sample mean of the population, $$\sigma_I^{2\alpha x} = \frac{\sum_{p=1}^{\|Items\|}((R_{I,p} - \mu_I^{\alpha x})^2 \times c_{I,p} \times \Gamma_p^{\alpha x})}{\sum_{p=1}^{\|Items\|}(c_{I,p} \times \Gamma_p^{\alpha x})}$$

is the variance of the sampling distribution, and $$N_I^{\alpha x} = \sum_{p=1}^{\|Items\|}(c_{I,p} \times \Gamma_p^{\alpha x})$$

is the sample size.

The total distance between the two feature value vectors is expressed mathematically by:

$$\Delta\left(FV_x^\alpha, \overrightarrow{FV}_y^\alpha\right) = \sqrt{\left(\frac{\|\text{Users}\|}{\sum_{l=1}^{\|\text{Users}\|} \eta_l^{\alpha_x} \times \eta_l^{\alpha_y}}\right) \times \left(\sum_{l=1}^{\|\text{Users}\|} \delta_l^{\alpha_{x,y}}\right)}$$

The feature value combination function combines the corresponding triplets from the two vectors by treating them as gaussians, and therefore is represented mathematically by:

$$\Omega\left(\overrightarrow{FV}_x^\alpha, \overrightarrow{FV}_y^\alpha\right) = \begin{cases} \left\langle \mu_I^{\alpha_{x,y'}}, \sigma_I^{2\alpha_{x,y'}}, N_I^{\alpha_{x,y'}} \right\rangle & \text{if } \eta_I^{\alpha_x} = 1 \text{ and } \eta_I^{\alpha_y} = 1 \\ \left\langle \mu_I^{\alpha_x}, \sigma_I^{2\alpha_x}, N_I^{\alpha_x} \right\rangle & \text{if } \eta_I^{\alpha_x} = 1 \text{ and } \eta_I^{\alpha_y} = 0 \\ \left\langle \mu_I^{\alpha_y}, \sigma_I^{2\alpha_y}, N_I^{\alpha_y} \right\rangle & \text{if } \eta_I^{\alpha_x} = 0 \text{ and } \eta_I^{\alpha_y} = 1 \end{cases}$$

where $$\mu_I^{\alpha_{x,y'}} = \frac{(N_I^{\alpha_x} \times \mu_I^{\alpha_x}) + (N_I^{\alpha_y} \times \mu_I^{\alpha_{yx}})}{(N_I^{\alpha_x} + N_I^{\alpha_y})}$$

represents the mean of the new population, $$\sigma_I^{2\alpha_{x,y'}} = \left(\frac{(N_I^{\alpha_x} \times \sigma_I^{2\alpha_x}) + (N_I^{\alpha_y} \times \sigma_I^{2\alpha_y})}{(N_I^{\alpha_x} + N_I^{\alpha_y})}\right) + \left(\frac{(N_I^{\alpha_x} + N_I^{\alpha_y}) \times (\mu_I^{\alpha_x} - \mu_I^{\alpha_y})^2}{(N_I^{\alpha_x} + N_I^{\alpha_y})^2}\right)$$

represents the variance of the combined population, and $$N_I^{\alpha_{x,y'}} = (N_I^{\alpha_x} + N_I^{\alpha_y})$$

represents the sample size of the combined population.

The third method of calculating feature value similarity metrics attempts to take into account the variance of the sampling distribution when the sample size of the population is small. A more accurate estimator of the population variance is given by the term $$S_I^{2\alpha_x} = \frac{\sum_{p=1}^{\|Items\|} \left((R_{I,p} - \mu_I^{\alpha_x})^2 \times c_{I,p} \times \Gamma_p^{\alpha_x}\right)}{\left(\sum_{p=1}^{\|Items\|} (c_{I,p} \times \Gamma_p^{\alpha_x})\right) - 1}$$

and represents the sample variance, which is an accurate estimator of the underlying population variance.

Accordingly operator $\eta_I^{\alpha_x}$ is redefined as:

$$\eta_I^{\alpha_x} = \begin{cases} 1 & \text{if } \left(\sum_{p=1}^{\|Items\|} C_{I,p} / \Gamma_p^{\alpha_x}\right) > 1 \\ 0 & \text{Otherwise} \end{cases}$$

and the triplet is defined as:

$$\overrightarrow{v}_I^{\alpha_x} = \left\langle \mu_I^{\alpha_x}, S_I^{2\alpha_x}, N_I^{\alpha_x} \right\rangle$$

Given the above, the sample variance is represented as:

$$S_I^{2\alpha_x} = \frac{\sum_{p=1}^{\|Items\|} \left((R_{I,p} - \mu_I^{\alpha_x})^2 \times c_{I,p} \times \Gamma_p^{\alpha_x}\right)}{N_I^{\alpha_x} - 1}$$

The sample variance and the variance of the sample distribution for a finite population are related by the following relationship:

$$\sigma^2 = \left(\frac{N-1}{N}\right) \times S^2$$

which transforms the standard deviation into:

$$\sigma_I^{2\alpha_{x,y}} = \left(\frac{N_I^{\alpha_x} - 1}{(N_I^{\alpha_x})^2}\right) \times S_I^{2\alpha_x} + \left(\frac{N_I^{\alpha_y} - 1}{(N_I^{\alpha_y})^2}\right) \times S_I^{2\alpha_x}$$

Thus, the feature value vector combination function is defined as:

$$\Omega\left(\overrightarrow{FV}_x^\alpha, \overrightarrow{FV}_y^\alpha\right) = \begin{cases} \left\langle \mu_I^{\alpha_{x,y'}}, S_I^{2\alpha_{x,y'}}, N_I^{\alpha_{x,y'}} \right\rangle & \text{if } \eta_I^{\alpha_x} = 1 \text{ and } \eta_I^{\alpha_y} = 1 \\ \left\langle \mu_I^{\alpha_x}, S_I^{2\alpha_x}, N_I^{\alpha_x} \right\rangle & \text{if } \eta_I^{\alpha_x} = 1 \text{ and } \eta_I^{\alpha_y} = 0 \\ \left\langle \mu_I^{\alpha_y}, S_I^{2\alpha_y}, N_I^{\alpha_y} \right\rangle & \text{if } \eta_I^{\alpha_x} = 0 \text{ and } \eta_I^{\alpha_y} = 1 \end{cases}$$

Regardless of the feature value combination function used, the item similarity metrics generated by them are used to generate feature value clusters. Feature value clusters are generated from the item similarity metrics using any clustering algorithm known in the art. For example, the method described above with respect to grouping items could be used to group values within each feature.

Feature values can be clustered both periodically and incrementally. Incremental clustering is necessary when the number of feature values for items is so large that reclustering of all feature values cannot be done conveniently. However, incremental clustering may be used for any set of items, and it is preferred to use both periodic reclustering and incremental reclustering.

All feature values are periodically reclustered using any clustering method known in the art, such as K-means. It is preferred that this is done infrequently, because of the time that may be required to complete such a reclustering. In order to cluster new feature values present in items new to the domain, feature values are incrementally clustered. New feature values present in the new items are clustered into the already existing feature value clusters. These feature values may or may not be reclustered into another feature value cluster when the next complete reclustering is done.

Figure 2:
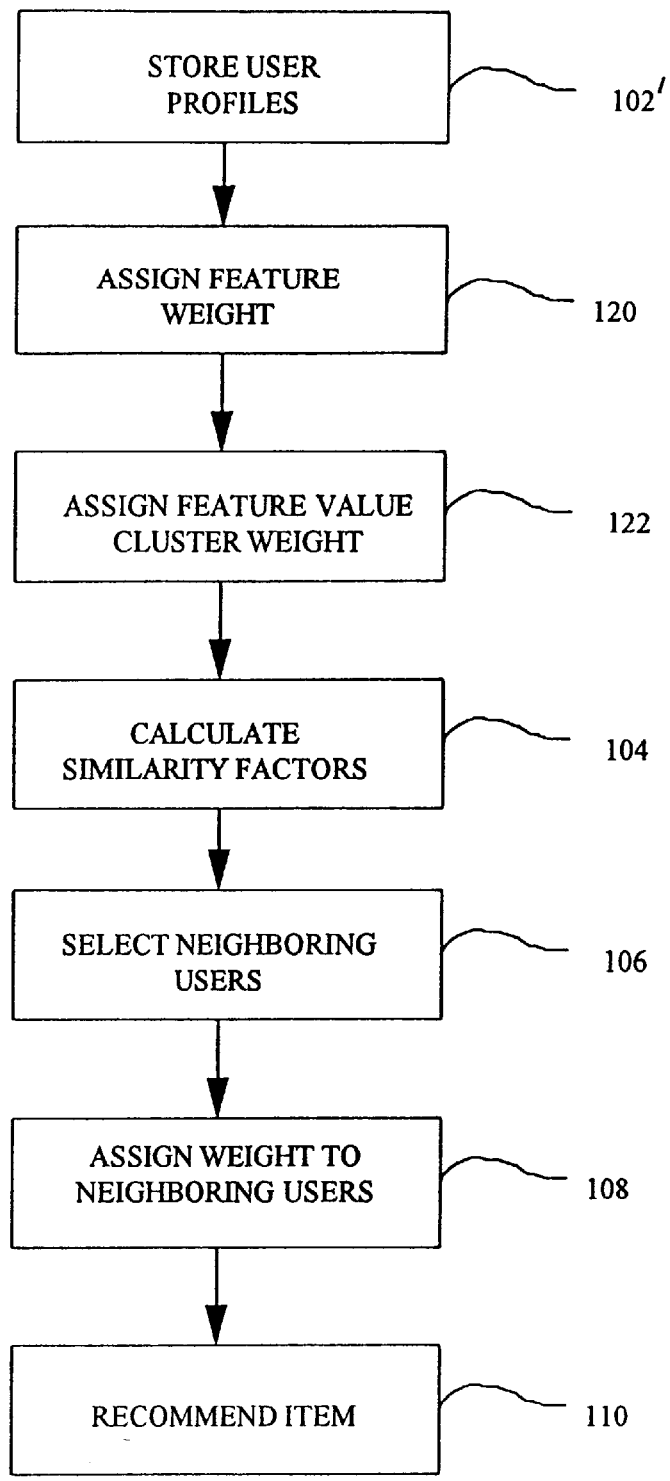
FIG. 2 is a flowchart of another embodiment of the method.

Using the feature value clusters generated by any one of the methods described above, a method for recommending an item, as shown in FIG. 2, uses feature clusters to aid in predicting ratings and proceeds as the method of FIG. 1, in that a plurality of user profiles is stored (step 102'). As above, a plurality of item profiles may also be stored. The method using feature value clusters assigns a weight to each feature value cluster and a weight to each feature based on the users rating of the item (steps 120 and 122).

A feature value cluster weight for each cluster is calculated for each user based on the user's ratings of items having that cluster. The cluster weight is an indication of how important a particular user seems to find a particular feature value cluster. For example, a feature for an item in a music domain might be the identity of the producer. If a user rated highly all items having a particular producer (or cluster of producers), then the user appears to place great emphasis on that particular producer (feature value) or cluster of producers (feature value cluster).

Any method of assigning feature value cluster weight that takes into account the user's rating of the item and the existence of the feature value cluster for that item is sufficient. However, it is currently preferred to assign feature value cluster weights by summing all of the item ratings that a user has entered and dividing by the number of feature value clusters. Expressed mathematically, the vector weight for cluster x of feature $\alpha$ for user I is:

$$\vec{CW}_I^{\prime\alpha_x} = \begin{cases} \dfrac{\sum_{p=1}^{\|Items\|} R_{I,p} \times c_{I,p} \times \gamma_p^{\alpha_x}}{\sum_{p=1}^{\|Items\|} c_{I,p} \times \gamma_p^{\alpha_x}} & \text{iff } \sum_{p=1}^{\|Items\|} c_{I,p} \times \gamma_p^{\alpha_x} \geq 1 \\ 0.0 & \text{otherwise} \end{cases}$$

where $\gamma_p^{\alpha_x}$ is a boolean operator indicating whether item p contains the feature value cluster x of feature $\alpha$.

The feature value cluster weight is used, in turn, to define a feature weight. The feature weight reflects the importance of that feature relative to the other features for a particular feature. Any method of estimating a feature weight can be used; for example, feature weights may be defined as the reciprocal of the number of features defined for all items. It is preferred that feature weights are defined as the standard deviation of all cluster weight divided by the means of all cluster weights. Expressed mathematically:

$$\vec{FW}_I^{\prime\alpha} = \frac{\text{StandardDev}(\vec{CW}_I^\alpha)}{\text{Mean}(\vec{CW}_I^\alpha)}$$

The feature value cluster weights and the feature weights are used to calculate the similarity factor between two users. The similarity factor between two users may be calculated by any method that takes into account the assigned weights. For example, any of the methods for calculating the similarity between two users, as described above, may be used provided they are augmented by the feature weights and feature value weights. Thus $$D_{I,J} = \sum_{\alpha=1}^{\|FeaturesDefined\|} \vec{FW}_I^\alpha \times \left( \sum_{\alpha_x=1}^{\|\alpha\|} \vec{D}_{I,J}^{\alpha_x} \times \vec{CW}_I^{\alpha_x} \times \tau^{\alpha_x}(\vec{D}_{I,J}) \right)$$

represents the similarity between users I and J, where $\tau^{\alpha_x}(\vec{D}_{I,J})$ is a boolean operator on a vector of values indicating whether feature value cluster of x for feature $\alpha$ of the vector is defined and where $$\vec{D}_{I,J} = \begin{cases} \dfrac{\sum_{p=1}^{\|Items\|} (R_{I,p} - R_{J,p})^2 \times c_{I,p} \times c_{J,p} \times \gamma_p^{\alpha_x}}{\sum_{p=1}^{\|Items\|} c_{I,p} \times \gamma_p^{\alpha_x}} & \text{iff } \sum_{p=1}^{\|Items\|} c_{I,p} \times \gamma_p^{\alpha_x} \geq 1 \\ 0.0 & \text{otherwise} \end{cases}$$

The representation of an item as a set of feature values allows the application of various feature-based similarity metrics between items. Two items may not share any identical feature values but still be considered quite similar to each other if they share some feature value clusters. This allows the recommendation of unrated items to a user based on the unrated items similarity to other items which the user has already rated highly.

The similarity between two items $p_1$ and $p_2$, where $P_1$ and $P_2$ represent the corresponding sets of feature values possessed by these items, can be represented as some function, f, of the following three sets: the number of common feature values shared by the two items; the number of feature values that $p_1$ possesses that $p_2$ does not; and the number of feature values that $p_2$ possesses that $p_1$ does not.

Thus, the similarity between two items, denoted by $S(p_1, p_2)$, is represented as:

$$S(p_1, p_2) = F(P_1 \cap P_2, P_1 - P_2, P_2 - P_1)$$

Each item is treated as a vector of feature value clusters and the item-item similarity metrics are defined as:

$$f(P_1 \cap P_2) = \sum_{\alpha=1}^{\|FeaturesDefined\|} \vec{FW}_I^\alpha \times \sum_{\alpha_x=1}^{\|\alpha\|} (\vec{CW}_I^{\alpha_x} \times \gamma_{p_1}^{\alpha_x} \times \gamma_{p_2}^{\alpha_x})$$

$$f(P_1 - P_2) = \sum_{\alpha=1}^{\|FeaturesDefined\|} \vec{FW}_I^\alpha \times \sum_{\alpha_x=1}^{\|\alpha\|} (\vec{CW}_I^{\alpha_x} \times \gamma_{p_1}^{\alpha_x} \times (1 - \gamma_{p_2}^{\alpha_x}))$$

$$f(P_2 - P_1) = \sum_{\alpha=1}^{\|FeaturesDefined\|} \vec{FW}_I^\alpha \times \sum_{\alpha_x=1}^{\|\alpha\|} (\vec{CW}_I^{\alpha_x} \times (1 - \gamma_{p_1}^{\alpha_x}) \times \gamma_{p_2}^{\alpha_x})$$

This metric is personalized to each user since the feature weights and cluster weights reflect the relative importance of a particular feature value to a user.

Another method of defining item-item similarity metrics attempts to take into account the case where one pair of items has numerous identical feature values, because if two items share a number of identical feature values, they are more similar to each other then two items that do not share feature values. Using this method, $f(P_1 \cap P_2)$ is defined as:

$$f(P_1 \cap P_2) = \sum_{\alpha=1}^{\|Features Defined\|} \vec{FW}_I^\alpha \times \left( \sum_{\alpha_x=1}^{\|\alpha\|} (\vec{CW}_I^{\alpha_x} \times \gamma_{p_1}^{\alpha_x} \times \gamma_{p_2}^{\alpha_x}) + \sum_{i=1}^{\|FV^\alpha\|} (\Gamma_{p_1}^{\alpha_x} \times \Gamma_{p_2}^{\alpha_x}) \right)$$

Another method for calculating item-item similarity is to treat each item as a vector of feature value clusters and then compute the weighted dot product of the two vectors. Thus, $$S(p_1, p_2) = g(P_1 \cap P_2)$$

where $$g(P_1 \cap P_2) = \sum_{\alpha=1}^{\|Features Defined\|} F\vec{W}_I^\alpha \times \sum_{\alpha_x=1}^{\|\alpha\|} \left(C\vec{W}_I^{\alpha_x} \times \gamma_{p1}^{\alpha_x} \times \gamma_{p2}^{\alpha_x}\right)$$

In another aspect, the system and method may be used to identify users that will enjoy a particular item. In this aspect, as above, user profiles and item profiles are stored in a memory element, and the user profiles and item profiles record ratings given to items by users. An item profile contains at least an identification of a user and the rating given to that item by that user. The item profile may contain additional information just as described in connection with user profiles. Similarity factors between items are calculated using any of the methods described above. For example, using the squared difference method for calculating similarity factors, the rating given to a first item by User A and the rating given to a second item by User A are subtracted and that difference is squared. This is done for each user that has rated both items. The squared differences are then summed and divided by the total number of users that have rated both items.

This provides an item-item similarity metric and a group of neighboring items is selected in the same way as described above. Those neighboring items are then weighted and a user, or group of users, that will be receptive to a given item are determined. Again, this may be done using any of the methods described above, including using confidence factors, item grouping, or feature guided automated collaborative filtering.

The methods described above can be provided as software on any suitable medium that is readable by a computing device. The software programs means may be implemented in any suitable language such as, C, C++, PERL, LISP, ADA, assembly language or machine code. The suitable media may be any device capable of storing program means in a computer-readable fashion. such as a floppy disk, a hard disk, an optical disk, a CD-ROM, a magnetic tape, a memory card, or a removable magnetic drive.

Figure 3:
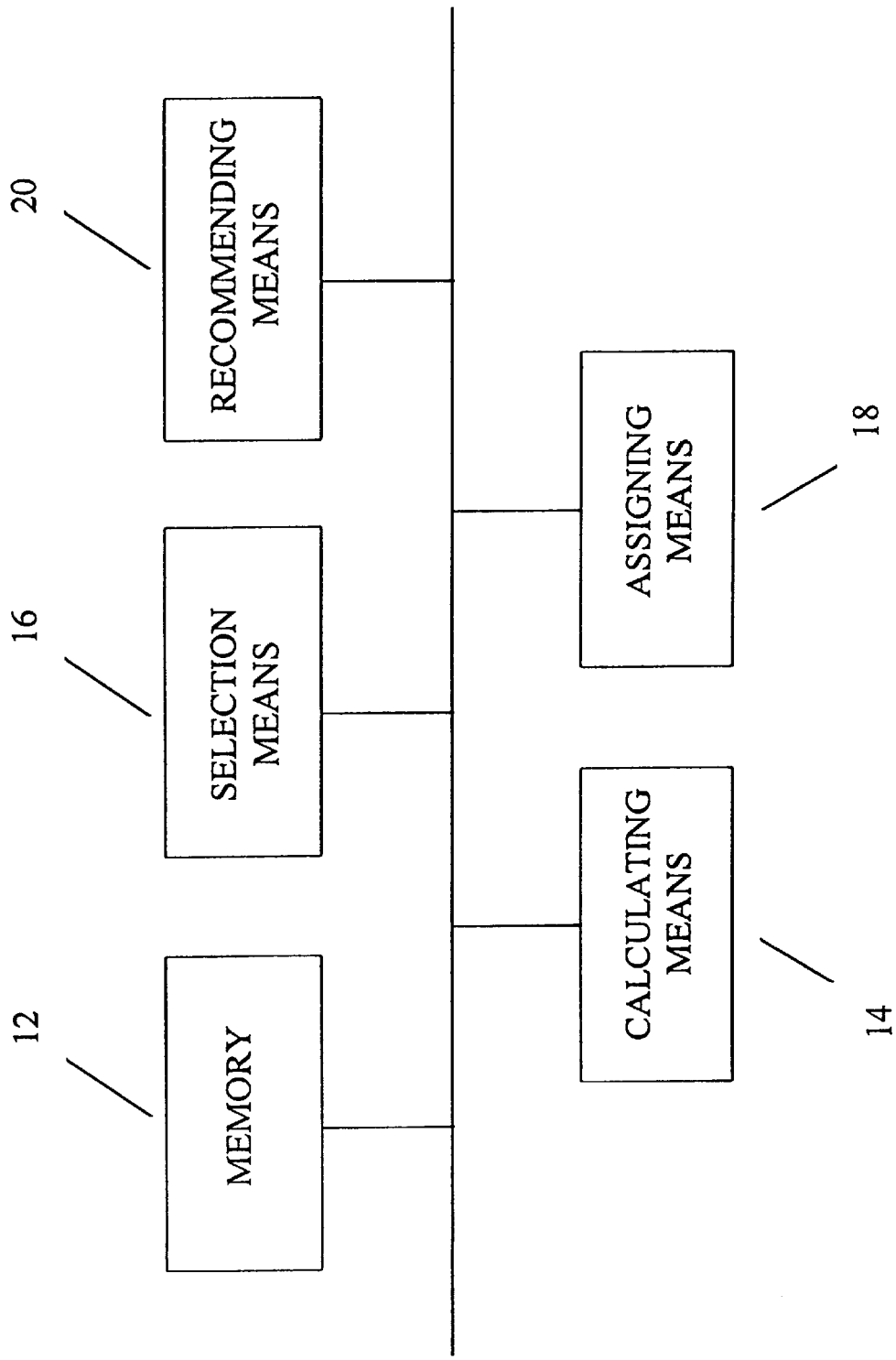
FIG. 3 is a block diagram of an embodiment of the apparatus.

An apparatus may be provided to recommend items to a user. The apparatus, as shown in FIG. 3 has a memory element 12 for storing user and item profiles. Memory element 12 can be any memory element capable of storing the profiles such as, RAM EPROM, or magnetic media.

A means 14 for calculating is provided which calculates the similarity factors between users. Calculating means 14 may be specialized hardware to do the calculation or, alternatively, calculating means 14 may be a microprocessor or software running on a microprocessor resident in a general-purpose computer.

Means 16 for selecting is also provided to select neighboring users responsive to the similarity factors. Again, specialized hardware or a microprocessor may be provided to implement the selecting means 16, however preferred is to provide a software program running on a microprocessor resident in a general-purpose computer. Selecting means 16 may be a separate microprocessor from calculating means 14 or it may be the same microprocessor.

A means 18 for assigning a weight to each of the neighboring users is provided and can be specialized hardware, a separate microprocessor, the same microprocessor as calculating means 14 and selecting means 16, or a microprocessor resident in a general-purpose computer and running software.

In some embodiments a receiving means is included in the apparatus (not shown in FIG. 3). Receiving means is any device which receives ratings for items from users. The receiving means may be a keyboard or mouse connected to a personal computer. In some embodiments, an electronic mail system operating over a local are network or a wide area network forms the receiving means. In the preferred embodiment, a World Wide Web Page connected to the Internet forms the receiving means.

Also included in the apparatus is means 20 for recommending at least one of the items to the users based on the weights assigned to the users, neighboring users and the ratings given to the item by the users' neighboring users. Recommendation means 20 may be specialized hardware, a microprocessor, or, as above, a microprocessor running software and resident on a general-purpose computer. Recommendation means 20 may also comprise an output device such as a display, audio output, or printed output.

In another embodiment an apparatus for recommending an item is provided that uses feature weights and feature value weights. This apparatus is similar to the one described above except that it also includes a means for assigning a feature value cluster weight 22 and a means for assigning a feature weight 24 (not shown in FIG. 3). Feature value cluster weight assigning means 22 and feature value weight assigning means 24 may be provided as specialized hardware, a separate microprocessor, the same microprocessor as the other means, or as a single microprocessor in a general purpose computer.

Figure 4:
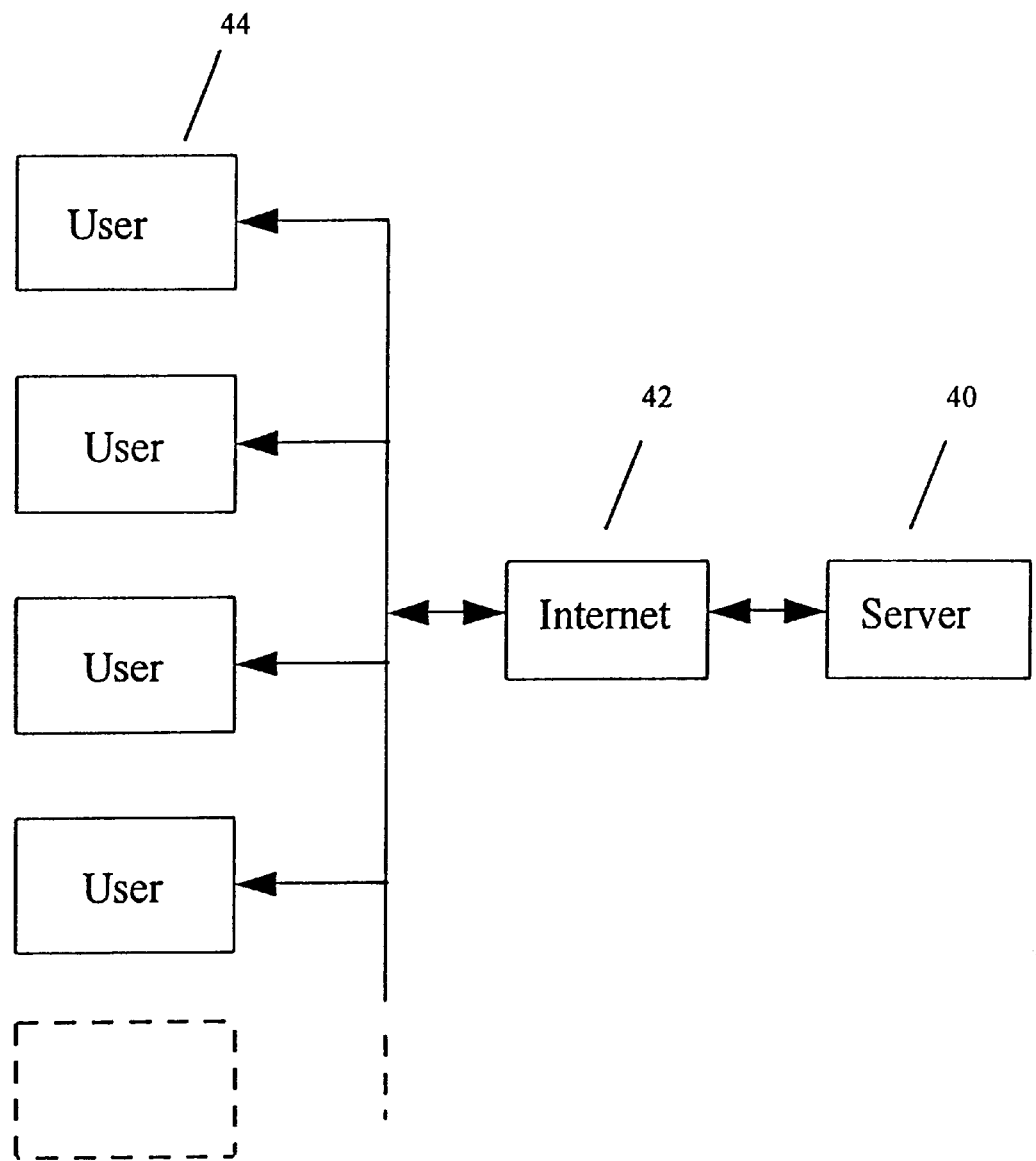
FIG. 4 is a block diagram of an Internet system on which the method and apparatus may be used.

FIG. 4 shows the Internet system on which an embodiment of the method and apparatus may be used. The server 40 is an apparatus as shown in FIG. 3, and it is preferred that server 40 displays a World Wide Web Page when accessed by a user via Internet 42. Server 40 also accepts input over the Internet 42. Multiple users 44 may access server 40 simultaneously. In other embodiments, the system may be a stand-alone device, e.g. a kiosk, which a user physically approaches and with which the user interacts. Alternatively, the system may operate on an organization's internal web, commonly known as an Intranet, or it may operate via a wireless network, such as satellite broadcast.

EXAMPLE 1

The following example is one way of using the invention, which can be used to recommend items in various domains for many items. By way of example, a new user 44 accesses the system via the World Wide Web. The system displays a welcome page, which allows the user 44 to create an alias to use when accessing the system. Once the user 44 has entered a personal alias, the user 44 is asked to rate a number of items, in this example the items to be rated are recording artists in the music domain.

After the user 44 has submitted ratings for various recording artists, the system allows the user 44 to enter ratings for additional artists or to request recommendations. If the user 44 desires to enter ratings for additional artists, the system can provide a list of artists the user 44 has not yet rated. For the example, the system can simply provide a random listing of artists not yet rated by the user 44. Alternatively, the user 44 can request to rate artists that are similar to recording artists they have already rated, and the system will provide a list of similar artists using the item similarity values previously calculated by the system. The user can also request to rate recording artists from a particular group, e.g. modern jazz, rock, or big band, and the system will provide the user 44 with a list of artists belonging to that group that the user 44 has not yet rated. The user 44 can also request to rate more artists that the user's 44 neighboring users have rated, and the system will provide the user 44 with a list of artists by selecting artists rated by the user's 44 neighboring users.

The user 44 can request the system to make artist recommendations at any time, and the system allows the user 44 to tailor their request based on a number of different factors. Thus, the system can recommend artists from various groups that the user's 44 neighboring users have also rated highly. Similarly, the system can recommend a predetermined number of artists from a particular group that the user will enjoy, e.g. opera singers. Alternatively, the system may combine these approaches and recommend only opera singers that the user's neighboring users have rated highly.

The system allows the user 44 to switch between rating items and receiving recommendations many times. The system also provides a messaging function, so that users 44 may leave messages for other users that are not currently using the system. The system provides "chat rooms," which allow users 44 to engage in conversation with other users 44' that are currently accessing the system. These features are provided to allow users 44 to communicate with one another. The system facilitates user communication by informing a user 44 that another user 44' shares an interest in a particular recording artist. Also, the system may inform a user 44 that another user 44 that shares an interest in a particular recording artists is currently accessing the system, the system will not only inform the user 44, but will encourage the user 44 to contact the other user 44' that shares the interest. The user 44 may leave the system by logging off of the Web Page.

EXAMPLE 2

In another example, the system is provided as a stand-alone kiosk which is used by shoppers in a retail establishment. The kiosk has an output device such as a display screen or printer, and possible an input device, such as a touch screen or keyboard. The kiosk has a memory element which allows it to store profiles for items and users. In come cases, the kiosk may be provided with a CD-ROM drive for allowing "preseeded" user and item profiles to be loaded into the kiosk.

In this example, a user may approach a kiosk to determine an item which is recommended for them. The user would input their alias from the system of EXAMPLE 1, and the kiosk could access the CD-ROM in order to load the user's profile into memory. The kiosk may also load similarity factors which have been calculated before hand or the kiosk may calculate the similarity factors now. The kiosk can then use any of the methods described above to create a list of recommended item which may be printed out for the user, displayed to the user on the display screen, or read aloud to the user through an audio device.

The kiosk may also provide the user with directions for how to find recommended items in the retail establishment, or the kiosk may allow the user to purchase the item directly by interacting with the kiosk.

Having described preferred embodiments of the invention, it will now become apparent to one of skill in the art that other embodiments incorporating the concepts may be used. It is felt, therefore, that these embodiments should not be limited to disclosed embodiments but rather should be limited only by the spirit and scope of the following claims.

What is claimed is:

1. A method for operating a machine to recommend an item to one of a plurality of users, the item not yet rated by the user, the method comprising the steps of:

(a) storing, using the machine, a user profile in a memory for each of the plurality of users, wherein at least one of the user profiles includes a plurality of values, one of the plurality of values representing a rating given to one of a plurality of items by the user and another of the plurality of values representing additional information;

(b) calculating, using the machine, for the user, a plurality of similarity factors responsive to both ratings given to items by the user and the additional information, each of the plurality of similarity factors representing a similarity between the user and another one of the plurality of users;

(c) selecting, using the machine, for the user, a plurality of neighboring users based on the similarity factors, the selecting step comprising the steps of, for each of the plurality of users:

(c1) comparing associated similarity factors for the user and each one of the plurality of users; and (c2) choosing said each one of the plurality of users as one of the neighboring users if a difference between the associated similarity factors exceeds a predetermined threshold value;

(d) assigning, using the machine, a weight to each of the neighboring users; and (e) recommending, using the machine, at least one of the plurality of items to the user based on the weights assigned to the plurality of neighboring users and ratings given to the plurality of items by the plurality of neighboring users.

2. The method of claim 1 wherein step (a) further comprises:

storing, using the machine, a user profile in a memory for each of the plurality of users, wherein at least one of the user profiles includes a plurality of values, one of the plurality of values representing a rating given to one of a plurality of items by the user and another of the plurality of values representing information relating to the given ratings.

3. The method of claim 1 wherein step (a) further comprises:

storing, using the machine, a user profile in memory for each of the plurality of users, wherein at least one of the user profiles includes a plurality of values, one of the plurality of values representing a rating given to one of a plurality of items by the user and another of the plurality of values representing information about the user.

4. The method of claim 1 wherein step (a) further comprises sub-steps of:

i) storing, in the machine, a user profile in a memory for each of the plurality of users, wherein at least one of the user profiles includes a plurality of values, one of the plurality of values representing a rating given to one of a plurality of items by the user and another of the plurality of values representing additional information; and ii) creating, using the machine, a confidence factor for one of the given ratings based on the additional information.

5. The method of claim 1 wherein step (c) further comprises:

calculating, using the machine, for a user, a plurality of similarity factors and a plurality of similarity confidence factors, each of the plurality of similarity factors representing a similarity between the user and another one of the plurality of users, and each of the similarity confidence factors representing possible imprecision in the associated similarity factor.

6. The method claim 5 wherein step (d) further comprises selecting, using the machine, for the user, a plurality of neighboring users from the plurality of other users based on the similarity factors and the similarity confidence factors.

7. The method of claim 5 wherein step (e) further comprises:

assigning, using the machine, a weight to each of the neighboring users, wherein the weight is the similarity confidence factor.

8. The method of claim 5 wherein step (e) further comprises:

i) recommending, using the machine, at least one of a plurality of items to the user based on the weights assigned to the plurality of neighboring users and the ratings given to the item by the plurality of neighboring users; and ii) generating, using the machine, a recommendation confidence factor based on the similarity confidence factors.

9. The method of claim 1 wherein step (c) further comprises:

calculating, using the machine, for a user, a plurality of similarity factors based on the ratings given to items by users and the additional information associated with the given ratings, each of the plurality of similarity factors representing a similarity between the user and another one of the plurality of users.

10. The method of claim 1 wherein the step of storing a user profile further comprises:

i) inferring, using the machine, a user's rating for one of the plurality of items based on the user's behavior;

ii) updating, using the machine, the user's profile with the inferred rating; and iii) calculating, using the machine, for the user a plurality of similarity factors, each of the plurality of similarity factors representing a similarity between the user and another user.

11. The method of claim 10 wherein the behavior of the user used to infer a user's rating includes, at least one of Web sites for which the user has created bookmarks, and a length of time that the user views a particular Web page.

12. The method of claim 1 further comprising the step of storing, using the machine, an item profile in a memory for each of the plurality of items, wherein at least one of the item profiles includes a plurality of values, at least one of the plurality of values representing a rating given to the item by one of the plurality of users.

13. The method of claim 12 wherein the step of storing a user profile further comprises:

i) inferring, using the machine, a user's rating for one of the plurality of items based on the user's behavior;

ii) retrieving, using the machine, the item profile;

iii) determining, using the machine, from the item profile, other users having ratings for the item; and iv) calculating, using the machine, a similarity factor between the user and each of the plurality of other users that have also rated the item.

14. The method of claim 1 wherein step (d) further comprises selecting, using the machine, for the user, at least one neighboring user based on the additional information.

15. The method of claim 1 wherein step (e) further comprises:

i) recommending, using the machine, at least one of the plurality of items to the user based on the weights assigned to the plurality of neighboring users and the ratings given to the item by the plurality of neighboring users; and ii) generating, using the machine, a recommendation confidence factor based on the additional information associated with the ratings given to the item.

16. The method of claim 1 wherein, in the step of selecting a plurality of neighboring users, if one of the plurality of users has cumulative item ratings, it is not selected as a neighboring user.

17. The method of claim 1 wherein, in the step of assigning a weight to each of the neighboring users, similar users are weighted more heavily that less similar users.

18. The method of claim 1 wherein, in the step of assigning a weight to each of the neighboring users, the weight is based on a confidence factors.

19. The method of claim 1 further comprising a step of grouping the plurality of items to define a plurality of groups, wherein each of the groups have a rating based on the ratings of the items defining the groups, and wherein, in the step of calculating, for a user, a plurality of similarity factors, the similarly factors are based on the ratings of the groups.

20. A computer-implemented method for operating a machine to recommend an item to one of a plurality of users, the item not yet rated by the user, the method comprising the steps, performed by the machine, of:

(a) storing a user profile in a memory for each of the plurality of users, wherein at least one of the user profiles includes a plurality of values, one of the plurality of values representing a rating given to one of a plurality of items by the user and another of the plurality of values representing additional information;

(b) calculating for the user, a plurality of similarity factors responsive to both ratings given to items by the user and the additional information, each of the plurality of similarity factors representing a similarity between the user and another one of the plurality of users;

(c) selecting for the user, a plurality of neighboring users based on the similarity factors, the selecting step comprising the steps of, for each of the plurality of users:

(c1) comparing associated similarity factors for the user and each one of the plurality of users; and (c2) choosing said each one of the plurality of users as one of the neighboring users if both a difference between the associated similarity factors is less than a first predetermined threshold and a total number of selected neighboring users is less than a second predetermined threshold;

(d) assigning a weight to each of the neighboring users; and (e) recommending at least one of the plurality of items to the user based on the weights assigned to the plurality of neighboring users and ratings given to the plurality of items by the plurality of neighboring users.

21. A computer-implemented method for operating a machine to recommend an item to one of a plurality of users, the item not yet rated by the user, the method comprising the steps, performed by the machine, of:

(a) storing a user profile in a memory for each of the plurality of users, wherein at least one of the user profiles includes a plurality of values, one of the plurality of values representing a rating given to one of a plurality of items by the user and another of the plurality of values representing additional information;

(b) calculating for the user, a plurality of similarity factors responsive to both ratings given to items by the user and the additional information, each of the plurality of similarity factors representing a similarity between the user and another one of the plurality of users;

(c) selecting for the user, a plurality of neighboring users based on the similarity factors, the selecting step comprising the steps of, for each of the plurality of users:
  (c1) comparing associated similarity factors for the user and each one of the plurality of users; and
  (c2) choosing said one of the plurality of users as one of the neighboring users if both a difference between the associated similarity factors is less than a first predetermined threshold and a confidence factor determined for the associated similarities factors is greater than a second predetermined threshold;
(d) assigning a weight to each of the neighboring users; and
(e) recommending at least one of the plurality of items to the user based on the weights assigned to the plurality of neighboring users and ratings given to the plurality of items by the plurality of neighboring users.

22. A computer-implemented method for operating a machine to recommend an item to one of a plurality of users, the item not yet rated by the user, the method comprising the steps, performed by the machine, of:
  (a) storing a user profile in a memory for each of the plurality of users, wherein at least one of the user profiles includes a plurality of values, one of the plurality of values representing a rating given to one of a plurality of items by the user and another of the plurality of values representing additional information;
  (b) calculating for the user, a plurality of similarity factors responsive to both ratings given to items by the user and the additional information, each of the plurality of similarity factors representing a similarity between the user and another one of the plurality of users;
  (c) selecting for the user, a plurality of neighboring users based on the similarity factors, the selecting step comprising the steps of:
    (c1) defining a domain of items to be recommended; and
    (c2) choosing each one of said users as one of the neighboring users unless said one user has less than a predetermined number of ratings of the items in the domain;
  (d) assigning a weight to each of the neighboring users; and
  (e) recommending at least one of the plurality of items to the user based on the weights assigned to the plurality of neighboring users and ratings given to the plurality of items by the plurality of neighboring users.

23. A computer-implemented method for operating a machine to recommend an item to one of a plurality of users, the item not yet rated by the user, the method comprising the steps, performed by the machine, of:
  (a) storing a user profile in a memory for each of the plurality of users, wherein at least one of the user profiles includes a plurality of values, one of the plurality of values representing a rating given to one of a plurality of items by the user and another of the plurality of values representing additional information;
  (b) grouping the plurality of items into a plurality of groups, wherein each of the groups has a rating based on the ratings of the items contained within said each group, wherein the grouping step comprises the steps of:
    (b1) randomly assigning all items to a number of initial groups;
    (b2) for each of the initial groups, determining a centroid of the ratings for the items assigned to the initial group;
    (b3) for each item, moving the item to the group with a centroid of ratings closest to its rating; and
    (b4) repeating steps (b1) through (b3) until both a certain number of iterations has been performed and distances, between all group centroids and items assigned to each of the groups, are below a predetermined threshold;
  (c) calculating for the user, a plurality of similarity factors in response to ratings given to items by the user, the additional information, and the ratings of the groups, wherein each of the plurality of similarity factors represents a similarity between the user and another one of the plurality of users;
  (d) selecting for the user, a plurality of neighboring users based on the similarity factors;
  (e) assigning a weight to each of the neighboring users; and
  (f) recommending at least one of the plurality of items to the user based on the weights assigned to the plurality of neighboring users and ratings given to the plurality of items by the plurality of neighboring users.

24. A computer readable medium having computer executable instructions stored therein, said instructions being executed by a computer for performing the steps of claim 1.

25. A computer readable medium having computer executable instructions stored therein, said instructions being excuted by a computer for performing the steps of claim 20.

26. A computer readable medium having computer executable instructions stored therein, said instructions being excuted by a computer for performing the steps of claim 21.

27. A computer readable medium having computer executable instructions stored therein, said instructions being excuted by a computer for performing the steps of claim 22.

28. A computer readable medium having computer executable instructions stored therein, said instructions being excuted by a computer for performing the steps of claim 23.

29. A Computer-implemented apparatus for recommending an item to one of a plurality of users, the item not yet rated by the user, the apparatus comprising:
  (a) a processor; and
  (b) a memory connected to the processor and storing computer executable instructions therein;
  (c) wherein the processor, in response to execution of the instructions:
    (c1) stores, in the memory, a user profile for each of the plurality of users, wherein at least one of the user profiles includes a plurality of values, one of the plurality of values representing a rating given to one of a plurality of items by the user and another of the plurality of values representing additional information;
    (c2) calculates, for the user, a plurality of similarity factors responsive to both ratings given to items by the user and the additional information, each of the plurality of similarity factors representing a similarity between the user and another one of the plurality of users;
    (c3) selects for the user, a plurality of neighboring users based on the similarity factors, by:
      (c3a) comparing associated similarity factors for the user and each one of the plurality of users; and (c3b) choosing said each one of the plurality of users as one of the neighboring users if a difference between the associated similarity factors exceeds a predetermined threshold value;

(d) assigns a weight to each of the neighboring users; and (e) recommends at least one of the plurality of items to the user based on the weights assigned to the plurality of neighboring users and ratings given to the plurality of items by the plurality of neighboring users.

30. A Computer-implemented apparatus for recommending an item to one of a plurality of users, the item not yet rated by the user, the apparatus comprising:

(a) a processor; and (b) a memory connected to the processor and storing computer executable instructions therein;

(c) wherein the processor, in response to execution of the instructions:

(c1) stores, in the memory, a user profile for each of the plurality of users, wherein at least one of the user profiles includes a plurality of values, one of the plurality of values representing a rating given to one of a plurality of items by the user and another of the plurality of values representing additional information;

(c2) calculates, for the user, a plurality of similarity factors responsive to both ratings given to items by the user and the additional information, each of the plurality of similarity factors representing a similarity between the user and another one of the plurality of users;

(c3) selects for the user, a plurality of neighboring users based on the similarity factors, by:

(c3a) comparing associated similarity factors for the user and each one of the plurality of users; and (c3b) choosing said each one of the plurality of users as one of the neighboring users if both a difference between the associated similarity factors is less than a first predetermined threshold and a total number of selected neighboring users is less than a second predetermined threshold;

(d) assigns a weight to each of the neighboring users; and (e) recommends at least one of the plurality of items to the user based on the weights assigned to the plurality of neighboring users and ratings given to the plurality of items by the plurality of neighboring users.

31. A Computer-implemented apparatus for recommending an item to one of a plurality of users, the item not yet rated by the user, the apparatus comprising:

(a) a processor; and (b) a memory connected to the processor and storing computer executable instructions therein;

(c) wherein the processor, in response to execution of the instructions:

(c1) stores, in the memory, a user profile for each of the plurality of users, wherein at least one of the user profiles includes a plurality of values, one of the plurality of values representing a rating given to one of a plurality of items by the user and another of the plurality of values representing additional information;

(c2) calculates, for the user, a plurality of similarity factors responsive to both ratings given to items by the user and the additional information, each of the plurality of similarity factors representing a similarity between the user and another one of the plurality of users;

(c3) selects for the user, a plurality of neighboring users based on the similarity factors, by:

(c3a) comparing associated similarity factors for the user and each one of the plurality of users; and (c3b) choosing said one of the plurality of users as one of the neighboring users if both a difference between the associated similarity factors is less than a first predetermined threshold and a confidence factor determined for the associated similarities factors is greater than a second predetermined threshold;

(d) assigns a weight to each of the neighboring users; and (e) recommends at least one of the plurality of items to the user based on the weights assigned to the plurality of neighboring users and ratings given to the plurality of items by the plurality of neighboring users.

32. A Computer-implemented apparatus for recommending an item to one of a plurality of users, the item not yet rated by the user, the apparatus comprising:

(a) a processor; and (b) a memory connected to the processor and storing computer executable instructions therein;

(c) wherein the processor, in response to execution of the instructions:

(c1) stores, in the memory, a user profile for each of the plurality of users, wherein at least one of the user profiles includes a plurality of values, one of the plurality of values representing a rating given to one of a plurality of items by the user and another of the plurality of values representing additional information;

(c2) calculates, for the user, a plurality of similarity factors responsive to both ratings given to items by the user and the additional information, each of the plurality of similarity factors representing a similarity between the user and another one of the plurality of users;

(c3) selects for the user, a plurality of neighboring users based on the similarity factors, by:

(c3a) defining a domain of items to be recommended; and (c3b) choosing each one of said users as one of the neighboring users unless said one user has less than a predetermined number of ratings of the items in the domain;

(d) assigns a weight to each of the neighboring users; and (e) recommends at least one of the plurality of items to the user based on the weights assigned to the plurality of neighboring users and ratings given to the plurality of items by the plurality of neighboring users.

33. A Computer-implemented apparatus for recommending an item to one of a plurality of users, the item not yet rated by the user, the apparatus comprising:

(a) a processor; and (b) a memory connected to the processor and storing computer executable instructions therein;

(c) wherein the processor, in response to execution of the instructions:

(c1) stores, in the memory, a user profile for each of the plurality of users, wherein at least one of the user profiles includes a plurality of values, one of the plurality of values representing a rating given to one of a plurality of items by the user and another of the plurality of values representing additional information;

(c2) groups the plurality of items into a plurality of groups, wherein each of the groups has a rating based on the ratings of the items contained within said each group, by:
- (c2a) randomly assigning all items to a number of initial groups;
- (c2b) for each of the initial groups, determining a centroid of the ratings for the items assigned to the initial group;
- (c2c) for each item, moving the item to the group with a centroid of ratings closest to its rating; and
- (c2d) repeating steps (c2a) through (c2c) until both a certain number of iterations has been performed and distances, between all group centroids and items assigned to each of the groups, are below a predetermined threshold;

(c3) calculates, for the user, a plurality of similarity factors in response to ratings given to items by the user, the additional information, and the ratings of the groups, wherein each of the plurality of similarity factors represents a similarity between the user and another one of the plurality of users;

(c4) selects for the user, a plurality of neighboring users based on the similarity factors;

(c5) assigns a weight to each of the neighboring users; and (c6) recommends at least one of the plurality of items to the user based on the weights assigned to the plurality of neighboring users and ratings given to the plurality of items by the plurality of neighboring users.

* * * * *

UNITED STATES PATENT AND TRADEMARK OFFICE
CERTIFICATE OF CORRECTION

PATENT NO.   : 6,041,311
DATED        : March 21, 2000
INVENTOR(S)  : Alexander Chislenko, Yezdezard Z. Lashkari, John E. McNulty It is certified that error appears in the above-identified patent and that said Letters Patent is hereby corrected as shown below:

Column 13:
Line 25 delete "which combines any";
Line 26 delete "two vectors in the space to produce a third point in the space";
Line 36 change "$\vec{V}^{ax}$" to -- $\vec{V}_I^{ax}$ --;

Column 16:
Line 66 after "having" insert -- features contained in --; and

Column 21:
Line 61 before "method" insert -- computer implemented --.

Signed and Sealed this

Seventh Day of August, 2001

*Attest:*

*Attesting Officer*

NICHOLAS P. GODICI
*Acting Director of the United States Patent and Trademark Office*